(12) United States Patent
Taguchi et al.

(10) Patent No.: US 11,563,380 B2
(45) Date of Patent: Jan. 24, 2023

(54) POWER DEVICE DRIVE APPARATUS AND METHOD FOR MANUFACTURING THE SAME

(71) Applicant: Mitsubishi Electric Corporation, Tokyo (JP)

(72) Inventors: Koichi Taguchi, Fukuoka (JP); Shoji Saito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 34 days.

(21) Appl. No.: 16/959,343

(22) PCT Filed: May 15, 2018

(86) PCT No.: PCT/JP2018/018787
§ 371 (c)(1),
(2) Date: Jun. 30, 2020

(87) PCT Pub. No.: WO2019/220544
PCT Pub. Date: Nov. 21, 2019

(65) Prior Publication Data
US 2020/0358362 A1    Nov. 12, 2020

(51) Int. Cl.
*H02M 3/335*    (2006.01)
*H02M 1/08*    (2006.01)

(52) U.S. Cl.
CPC ......... *H02M 3/33523* (2013.01); *H02M 1/08* (2013.01)

(58) Field of Classification Search
CPC .. H02M 3/33523; H02M 1/08; H02M 1/0006; H02M 1/0022
See application file for complete search history.

(56) References Cited

U.S. PATENT DOCUMENTS

| | | | | |
|---|---|---|---|---|
| 5,932,938 A * | 8/1999 | Shimamori | ........... | H02M 3/157 323/275 |
| 8,847,568 B2 * | 9/2014 | Barrenscheen | ....... | H02M 3/156 323/284 |

(Continued)

FOREIGN PATENT DOCUMENTS

| JP | H11113252 A | 4/1999 |
|---|---|---|
| JP | H11136938 A | 5/1999 |

(Continued)

OTHER PUBLICATIONS

An Office Action; "Notice of Reasons for Refusal," mailed by the Japanese Patent Office dated Jun. 22, 2021, which corresponds to Japanese Patent Application No. 2020-518859 and is related to U.S. Appl. No. 16/959,343 with with English translation.

(Continued)

*Primary Examiner* — Kyle J Moody
(74) *Attorney, Agent, or Firm* — Studebaker & Brackett PC

(57) ABSTRACT

A control unit (4) generates a control signal. A switching device (2) performs switching according to the control signal and generates a primary side input voltage from a supply voltage. A transformer (1) converts the primary side input voltage to a secondary side output voltage. A drive circuit (7) drives a power device (8) according to the secondary side output voltage. The control unit (4) includes a table listing a correspondence relationship between supply voltages and set values of control signals for obtaining a desired secondary side output voltage, refers to the table and generates the control signal having a set value corresponding to the supply voltage.

19 Claims, 5 Drawing Sheets

(56) References Cited

U.S. PATENT DOCUMENTS

| | | | |
|---|---|---|---|
| 10,252,626 B2* | 4/2019 | Tajima | B60L 53/60 |
| 11,394,306 B2* | 7/2022 | Xu | G01R 19/16528 |
| 2008/0012502 A1 | 1/2008 | Lys | |
| 2010/0038965 A1* | 2/2010 | Rohner | H02J 9/065 |
| | | | 307/66 |
| 2012/0153916 A1* | 6/2012 | Weinstein | H02M 3/1588 |
| | | | 323/283 |
| 2013/0051084 A1* | 2/2013 | Hachiya | H02M 3/33507 |
| | | | 363/21.01 |
| 2016/0280082 A1 | 9/2016 | Tajima et al. | |

FOREIGN PATENT DOCUMENTS

| | | |
|---|---|---|
| JP | 2009195095 A | 8/2009 |
| WO | 2015181919 A1 | 12/2015 |

OTHER PUBLICATIONS

International Search Report; Written Opinion; and Notification of Transmittal of the International Search Report and the Written Opinion of the International Searching Authority, or the Declaration issued in PCT/JP2018/018787; dated Jun. 26, 2018.

An Office Action mailed by the German Patent and Trade Mark Office dated Feb. 28, 2022, which corresponds to German Patent Application No. 112018007618.0 and is related to U.S. Appl. No. 16/959,343; with English language translation.

* cited by examiner

FIG. 2

| SUPPLY VOLTAGE[V] | DUTY RATIO[%] |
|---|---|
| 0 | 0 |
| ⋮ | ⋮ |
| 5 | 0 |
| ⋮ | ⋮ |
| A | 30 |
| ⋮ | ⋮ |
| B | 50 |
| ⋮ | ⋮ |
| C | 70 |
| ⋮ | ⋮ |

FIG. 5

| SUPPLY VOLTAGE[V] | CARRIER FREQUENCY[kHz] | DUTY RATIO[%] |
|---|---|---|
| 0 | 0 | 0 |
| ⋮ | ⋮ | ⋮ |
| 5 | 0 | 0 |
| ⋮ | ⋮ | ⋮ |
| A | D | 30 |
| ⋮ | ⋮ | ⋮ |
| B | D | 50 |
| ⋮ | ⋮ | ⋮ |
| A | E | 40 |
| ⋮ | ⋮ | ⋮ |
| B | E | 60 |
| ⋮ | ⋮ | ⋮ |

POWER DEVICE DRIVE APPARATUS AND METHOD FOR MANUFACTURING THE SAME

FIELD

The present disclosure relates to a power device drive apparatus and a method for manufacturing the same.

BACKGROUND

Higher functionality, higher accuracy and higher density are required for power devices. Even in an IPM in which a power device and a control substrate are integrated, further densification of the control substrate is required along with densification of the power device. Examples of means for densifying the control substrate include integration that incorporates discrete parts into an ASIC or a microcontroller. There is means for incorporating a dedicated power supply IC into the microcontroller, integrating them into a digital power supply to thereby achieve higher integration and higher functionality of the power supply apparatus (e.g., see PTL 1).

CITATION LIST

Patent Literature

PTL 1: JP 2009-195095 A

SUMMARY

Technical Problem

Conventional insulating digital power supply apparatuses use a photocoupler or transformer auxiliary winding to feed back a secondary side output voltage. The requirement for such a peripheral circuit would result in a problem of a cost increase.

The present invention has been implemented to solve the above-described problem and it is an object of the present invention to provide a power device drive apparatus and a method for manufacturing the same capable of preventing a cost increase.

Solution to Problem

A power device drive apparatus according to the present disclosure includes: a control unit generating a control signal; a switching device performing switching according to the control signal and generating a primary side input voltage from a supply voltage; a transformer converting the primary side input voltage to a secondary side output voltage; and a drive circuit driving a power device according to the secondary side output voltage, wherein the control unit includes a table listing a correspondence relationship between supply voltages and set values of control signals for obtaining a desired secondary side output voltage, refers to the table and generates the control signal having a set value corresponding to the supply voltage.

Advantageous Effects of Invention

In the present disclosure, the control unit refers to the table listing a correspondence relationship between supply voltages and set values of control signals for obtaining a desired secondary side output voltage, generates control signals having set values corresponding to the supply voltage and generates a primary side input voltage of the transformer from the supply voltage according to the control signals. This eliminates the necessity for a peripheral circuit that feeds back the secondary side output voltage of the transformer, and so it is possible to prevent a cost increase.

BRIEF DESCRIPTION OF THE DRAWINGS

FIG. 2 is a diagram illustrating the table according to the first embodiment.

FIG. 5 is a diagram illustrating a table according to the second embodiment.

DESCRIPTION OF EMBODIMENTS

A power device drive apparatus and a method for manufacturing the same according to the embodiments of the present disclosure will be described with reference to the drawings. The same components will be denoted by the same symbols, and the repeated description thereof may be omitted.

First Embodiment

Figure 1:
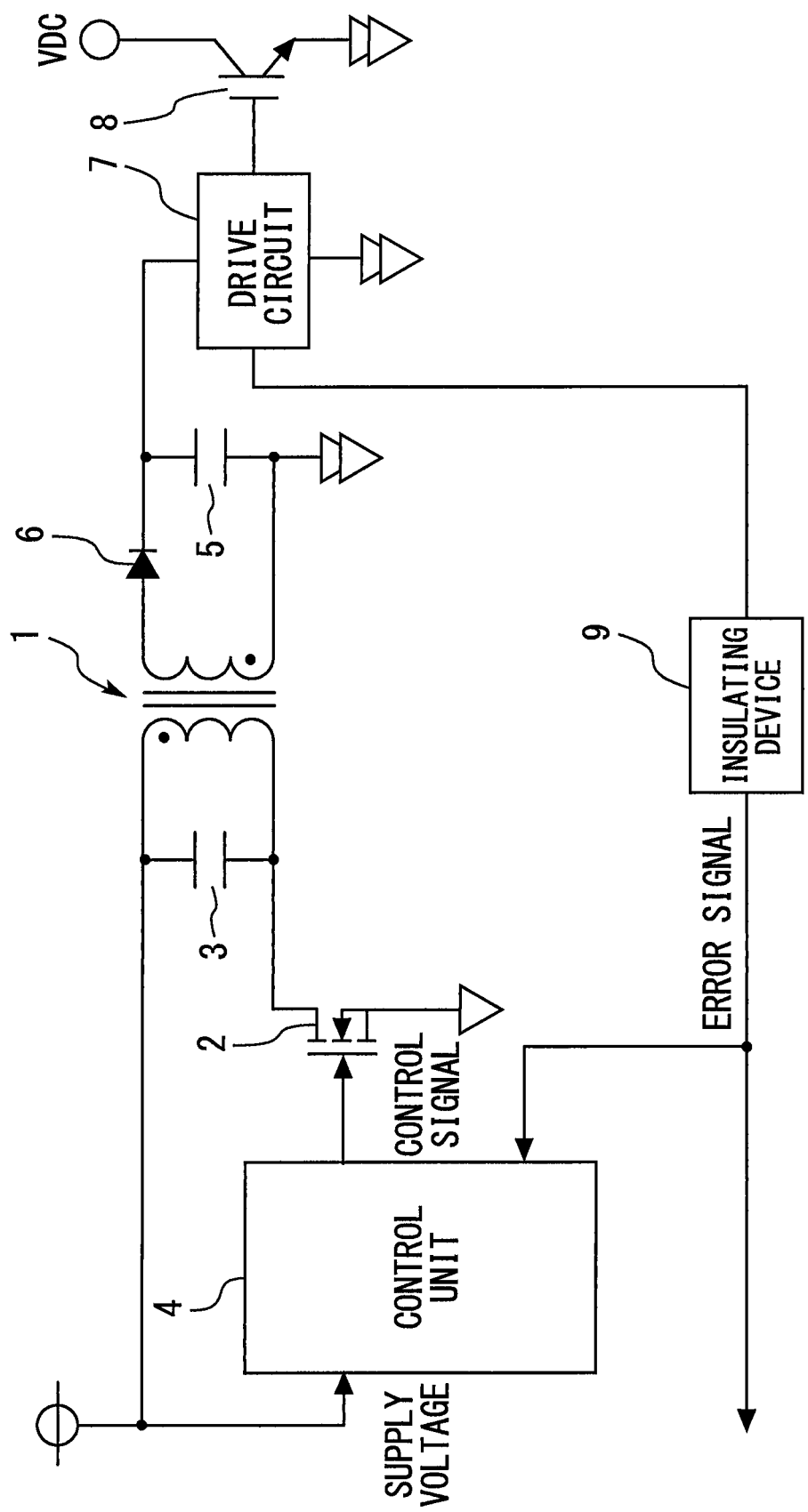
FIG. 1 is a circuit diagram illustrating a power device drive apparatus according to a first embodiment.

FIG. 1 is a circuit diagram illustrating a power device drive apparatus according to a first embodiment. A primary side coil of a transformer 1 and a switching device 2 are connected in series between a power supply terminal and a grounding terminal. A capacitor 3 is connected in parallel to the primary side coil of the transformer 1.

A control unit 4 receives a supply voltage and generates a control signal. The control signal outputted from the control unit 4 is inputted to a gate of the switching device 2. The switching device 2 performs switching according to the control signal and generates a primary side input voltage of the transformer 1 from the supply voltage. The transformer 1 converts the primary side input voltage to a secondary side output voltage.

A capacitor 5 is connected in parallel to a secondary side coil of the transformer 1. The secondary side output voltage of the transformer 1 is inputted to a drive circuit 7 via a diode 6. The drive circuit 7 drives a power device 8 according to the secondary side output voltage. The power device 8 is an IGBT or a power MOS transistor or the like. In the event of an abnormality such as a secondary side output short circuit, an error signal is outputted from the drive circuit 7. This error signal is inputted to the control unit 4 on the primary side via an insulating device 9 such as a photocoupler.

The control unit 4 includes a table listing a correspondence relationship between supply voltages and set values of control signals for obtaining a desired secondary side output voltage. The control signals are pulse width modulation signals. The set values of the control signals are duty ratios of the pulse width modulation signals. FIG. 2 is a diagram illustrating the table according to the first embodiment. The control unit 4 refers to the table in FIG. 2 and generates a control signal having a duty ratio corresponding to a supply voltage. It is thereby possible to obtain a desired secondary side output voltage. Note that the control unit 4 is realized by a processing circuit such as a CPU that executes a program stored in a memory or a system LSI. Furthermore, the above-described function may be executed by a plurality of processing circuits operating in cooperation.

Figure 3:
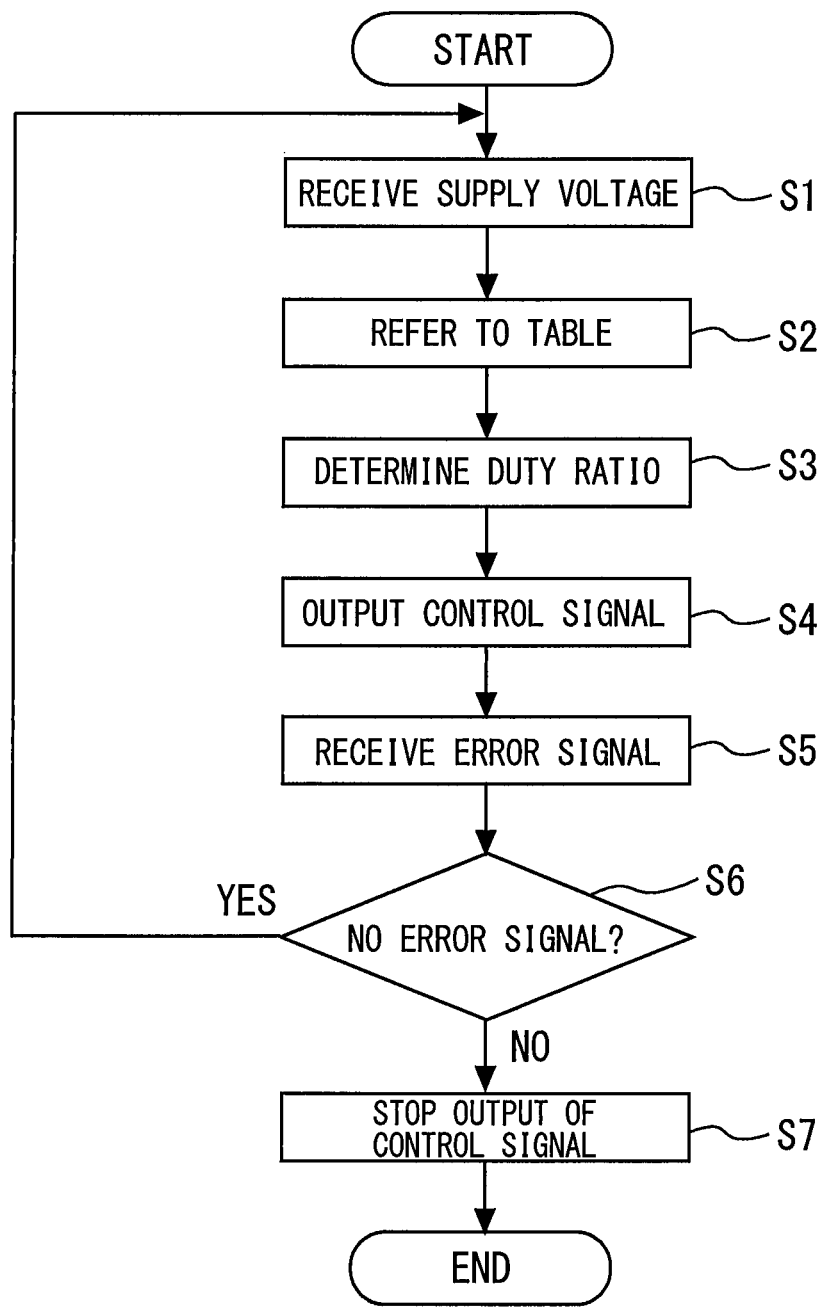
FIG. 3 is a flowchart illustrating operations of the control unit according to the first embodiment.

FIG. 3 is a flowchart illustrating operations of the control unit according to the first embodiment. First, the control unit 4 receives a supply voltage (step S1). Next, the control unit 4 refers to the table (step S2) and determines a duty ratio of a control signal corresponding to the supply voltage (step S3), and outputs the control signal having the duty ratio (step S4). Next, the control unit 4 receives an error signal transmitted from the secondary side to the primary side every time the duty ratio of the control signal is determined (step S5). The control unit 4 determines presence or absence of the error signal (step S6), stops output of the control signal in the event of an abnormality for which the error signal is transmitted to protect the power device drive apparatus (step S7).

As described above, in the present embodiment, the control unit 4 refers to the table listing a correspondence relationship between supply voltages and set values of control signals for obtaining a desired secondary side output voltage, generates control signals having set values corresponding to the supply voltage and generates a primary side input voltage of the transformer 1 from the supply voltage according to the control signals. This eliminates the necessity for a peripheral circuit that feeds back the secondary side output voltage of the transformer 1, and so it is possible to prevent a cost increase. Furthermore, since no feedback processing time is generated, responsiveness is also improved.

In the power device drive apparatus, large fluctuation factors of the secondary side output voltage are a supply voltage and a drive load of the power device 8. Regarding a vehicle-mounted drive power supply in particular, fluctuation width of the supply voltage is on the order of 8 to 16 V and there is no drastic fluctuation of the supply voltage. Therefore, even the control using a table as in the case of the present embodiment can handle fluctuations of the supply voltage. By setting a relatively higher output voltage in advance in consideration of a decrease in the output voltage during driving of the power device, it is also possible to handle fluctuations in the drive load of the power device.

Second Embodiment

Figure 4:
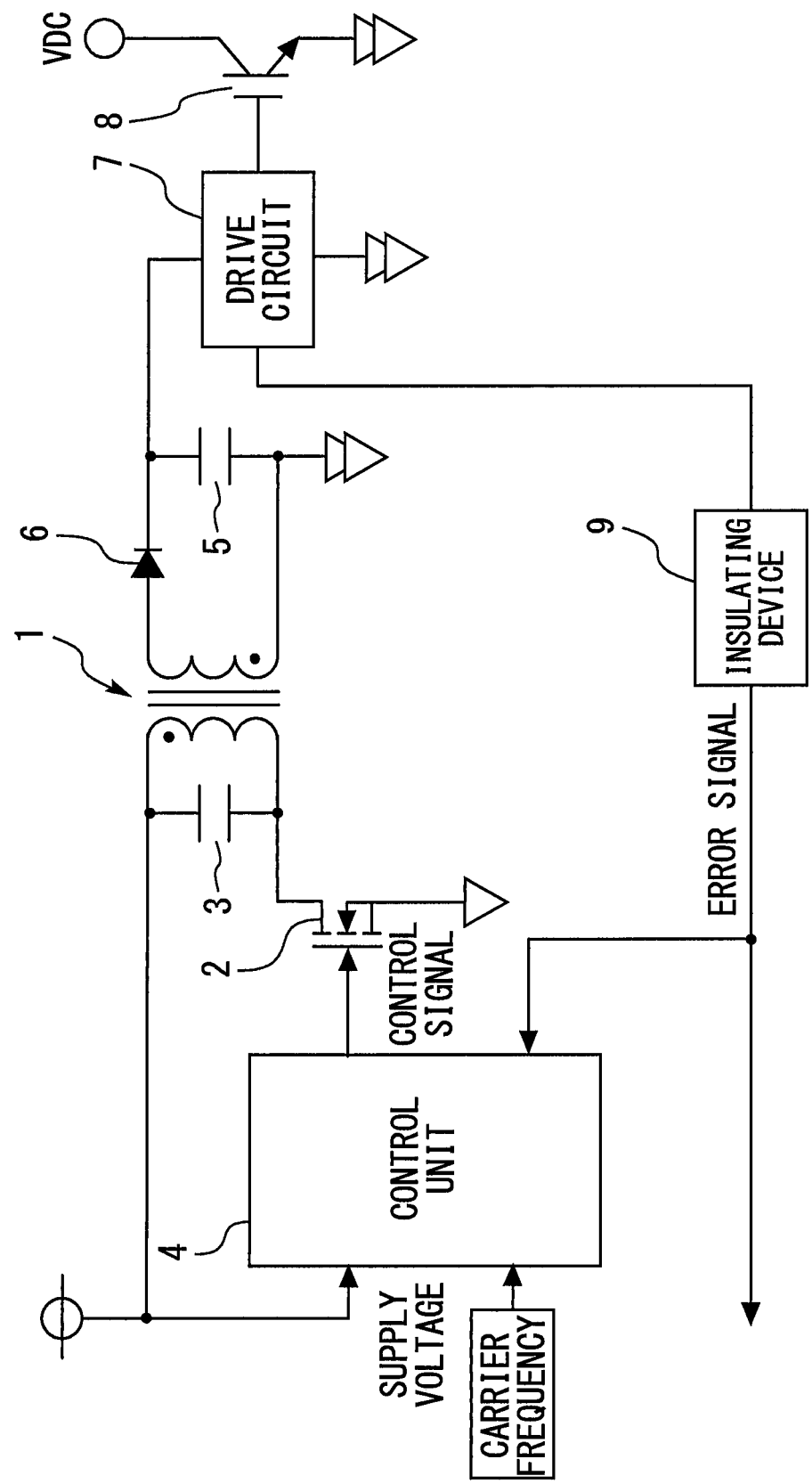
FIG. 4 is a circuit diagram illustrating a power device drive apparatus according to a second embodiment.

FIG. 4 is a circuit diagram illustrating a power device drive apparatus according to a second embodiment. In the first embodiment, only supply voltages are inputted to the control unit 4, whereas in the present embodiment, a carrier frequency, which is drive load information of the power device 8 is also inputted. FIG. 5 is a diagram illustrating a table according to the second embodiment. The table lists supply voltages, carrier frequencies of power devices and duty ratios of control signals for obtaining a desired secondary side output voltage. The control unit 4 refers to the table in FIG. 5 and generates a control signal having a duty ratio corresponding to the supply voltage and the carrier frequency of the power device. This makes it possible to handle output load fluctuations. The other components and effects are similar to those of the first embodiment.

The tables in the first and second embodiments are set based on experiment results. However, in an inspection step during manufacturing of the power device apparatus, the secondary side output voltage may be monitored while changing the supply voltage inputted to the control unit 4, and the table may be set so that the secondary side output voltage becomes a desired voltage. In this way, it is possible to cancel fluctuations in characteristics in the components and realize a more accurate power supply apparatus.

The power device 8 is not limited to a device formed of silicon, but instead may be formed of a wide-bandgap semiconductor having a bandgap wider than that of silicon. The wide-bandgap semiconductor is, for example, a silicon carbide, a gallium-nitride-based material, or diamond. A power device 8 formed of such a wide-bandgap semiconductor has a high voltage resistance and a high allowable current density, and thus can be miniaturized. The use of such a miniaturized power device 8 enables the miniaturization and high integration of the semiconductor module in which the power device 8 is incorporated. Further, since the power device 8 has a high heat resistance, a radiation fin of a heatsink can be miniaturized and a water-cooled part can be air-cooled, which leads to further miniaturization of the semiconductor module. Further, since the power device 8 has a low power loss and a high efficiency, a highly efficient semiconductor module can be achieved.

REFERENCE SIGNS LIST 1 transformer; 2 switching device; 4 control unit; 7 drive circuit; 8 power device

The invention claimed is:

1. A power device drive apparatus comprising:
a control unit generating a control signal;
a switching device performing switching according to the control signal and generating a primary side input voltage from a supply voltage;
a transformer converting the primary side input voltage to a secondary side output voltage; and
a drive circuit driving a power device according to the secondary side output voltage, the drive circuit being configured to provide an error signal to the control unit,
wherein the control unit includes a table listing a correspondence relationship between supply voltages and set values of control signals for obtaining a desired secondary side output voltage, refers to the table and generates the control signal having a set value corresponding to the supply voltage.

2. The power device drive apparatus according to claim 1, wherein the control unit generates the control signal without feeding back the secondary side output voltage.

3. The power device drive apparatus according to claim 2, wherein the control signal is a pulse width modulation signal, and
the table lists a correspondence relationship between supply voltages and duty ratios of control signals for obtaining a desired secondary side output voltage.

4. The power device drive apparatus according to claim 3, wherein the table lists supply voltages, drive load information of power devices and set values of control signals for obtaining a desired secondary side output voltage, and
the control unit refers to the table and generates the control signal having a set value corresponding to the supply voltage and drive load information of the power device.

5. A method for manufacturing the power device drive apparatus according to claim 4, wherein the secondary side output voltage is monitored while changing the supply voltage inputted to the control unit, and the table is set so that the secondary side output voltage becomes a desired voltage.

6. A method for manufacturing the power device drive apparatus according to claim 3, wherein the secondary side output voltage is monitored while changing the supply voltage inputted to the control unit, and the table is set so that the secondary side output voltage becomes a desired voltage.

7. The power device drive apparatus according to claim 2, wherein the table lists supply voltages, drive load information of power devices and set values of control signals for obtaining a desired secondary side output voltage, and the control unit refers to the table and generates the control signal having a set value corresponding to the supply voltage and drive load information of the power device.

8. A method for manufacturing the power device drive apparatus according to claim 7, wherein the secondary side output voltage is monitored while changing the supply voltage inputted to the control unit, and the table is set so that the secondary side output voltage becomes a desired voltage.

9. A method for manufacturing the power device drive apparatus according to claim 2, wherein the secondary side output voltage is monitored while changing the supply voltage inputted to the control unit, and the table is set so that the secondary side output voltage becomes a desired voltage.

10. The power device drive apparatus according to claim 1, wherein the control signal is a pulse width modulation signal, and the table lists a correspondence relationship between supply voltages and duty ratios of control signals for obtaining a desired secondary side output voltage.

11. The power device drive apparatus according to claim 10, wherein the table lists supply voltages, drive load information of power devices and set values of control signals for obtaining a desired secondary side output voltage, and the control unit refers to the table and generates the control signal having a set value corresponding to the supply voltage and drive load information of the power device.

12. A method for manufacturing the power device drive apparatus according to claim 11, wherein the secondary side output voltage is monitored while changing the supply voltage inputted to the control unit, and the table is set so that the secondary side output voltage becomes a desired voltage.

13. A method for manufacturing the power device drive apparatus according to claim 10, wherein the secondary side output voltage is monitored while changing the supply voltage inputted to the control unit, and the table is set so that the secondary side output voltage becomes a desired voltage.

14. The power device drive apparatus according to claim 1, wherein the table lists supply voltages, drive load information of power devices and set values of control signals for obtaining a desired secondary side output voltage, and the control unit refers to the table and generates the control signal having a set value corresponding to the supply voltage and drive load information of the power device.

15. A method for manufacturing the power device drive apparatus according to claim 14, wherein the secondary side output voltage is monitored while changing the supply voltage inputted to the control unit, and the table is set so that the secondary side output voltage becomes a desired voltage.

16. A method for manufacturing the power device drive apparatus according to claim 1, wherein the secondary side output voltage is monitored while changing the supply voltage inputted to the control unit, and the table is set so that the secondary side output voltage becomes a desired voltage.

17. The power device drive apparatus according to claim 1, wherein the drive circuit is positioned downstream of the transformer to receive the secondary side output voltage.

18. The power device drive apparatus according to claim 1, wherein the control unit generates the control signal having the set value in the table that has the correspondence relationship with the supply voltage.

19. A power device drive apparatus comprising:

a control unit generating a control signal;

a switching device performing switching according to the control signal and generating a primary side input voltage from a supply voltage;

a transformer converting the primary side input voltage to a secondary side output voltage; and a drive circuit driving a power device according to the secondary side output voltage, wherein the control unit includes a table listing a correspondence relationship between supply voltages, carrier frequencies of power devices, and set values of control signals for obtaining a desired secondary side output voltage, refers to the table, and generates the control signal having a set value corresponding to the supply voltage and a carrier frequency of the power device.

* * * * *